(12) United States Patent
Chevobbe et al.

(10) Patent No.: US 9,864,722 B2
(45) Date of Patent: Jan. 9, 2018

(54) SYSTEM AND METHOD FOR COMMUNICATION BETWEEN A DATA-ACQUISITION CIRCUIT AND A DATA-PROCESSING CIRCUIT

(71) Applicant: COMMISSARIAT A L'ENERGIE ATOMIQUE ET AUX ENERGIES ALTERNATIVES, Paris (FR)

(72) Inventors: Stephane Chevobbe, Bourg la Reine (FR); Marc Duranton, Orsay (FR)

(73) Assignee: Commissariat A L'Energie Atomique et aux Energies Alternatives, Paris (FR)

(*) Notice: Subject to any disclaimer, the term of this patent is extended or adjusted under 35 U.S.C. 154(b) by 484 days.

(21) Appl. No.: 14/367,734

(22) PCT Filed: Dec. 14, 2012

(86) PCT No.: PCT/EP2012/075566
§ 371 (c)(1),
(2) Date: Jun. 20, 2014

(87) PCT Pub. No.: WO2013/092419
PCT Pub. Date: Jun. 27, 2013

(65) Prior Publication Data
US 2015/0212970 A1    Jul. 30, 2015

(30) Foreign Application Priority Data

Dec. 20, 2011 (FR) .......................... 11 61987

(51) Int. Cl.
*G06F 13/42*    (2006.01)
*G06F 13/40*    (2006.01)

(52) U.S. Cl.
CPC ...... *G06F 13/4282* (2013.01); *G06F 13/4009* (2013.01); *G06F 13/4221* (2013.01)

(58) Field of Classification Search
CPC ... G11C 19/00; G11C 19/188; G06F 13/4282; G06F 13/4221; G06F 13/4009
See application file for complete search history.

(56) References Cited

U.S. PATENT DOCUMENTS 3,654,622 A * 4/1972 Beausoleil ........... G11C 19/188
                                                  711/200
4,747,081 A   5/1988 Heilveil et al.
(Continued)

OTHER PUBLICATIONS

Dudek et al., "A Pixel-Parallel Cellular Processor Array in a Stacked Three-Layer 3D Silicon-On-Insulator Technology", Circuit Theory and Design, Aug. 2009, pp. 193-196.

*Primary Examiner* — Farley Abad
(74) *Attorney, Agent, or Firm* — Baker Hostetler LLP

(57) ABSTRACT

A communication system coupled to a data-acquisition circuit and to a data-processing circuit is provided, including at least one shift register, an addressing circuit and a multiplexer. The shift register includes a serial input for inputting and storing data in series, a serial output for outputting data in series, and parallel outputs for outputting data stored in the shift register in parallel. The addressing circuit is coupled to the shift register in order to identify the positions of stored data, and the multiplexer is coupled to the parallel outputs of the shift register in order to output the stored data to the data-processing circuit in series. Methods for communication between a data-acquisition circuit and a data-processing circuit are also provided.

14 Claims, 5 Drawing Sheets

(56) References Cited

U.S. PATENT DOCUMENTS

| | | | |
|---|---|---|---|
| 4,876,641 A * | 10/1989 | Cowley | G06F 15/8023 |
| | | | 712/13 |
| 4,992,933 A * | 2/1991 | Taylor | G06F 9/30196 |
| | | | 712/209 |
| 6,128,114 A * | 10/2000 | Wingo | H04J 14/08 |
| | | | 398/1 |
| 6,166,748 A | 12/2000 | Van Hook et al. | |
| 2003/0007088 A1* | 1/2003 | Rantanen | H04N 5/2354 |
| | | | 348/371 |

* cited by examiner

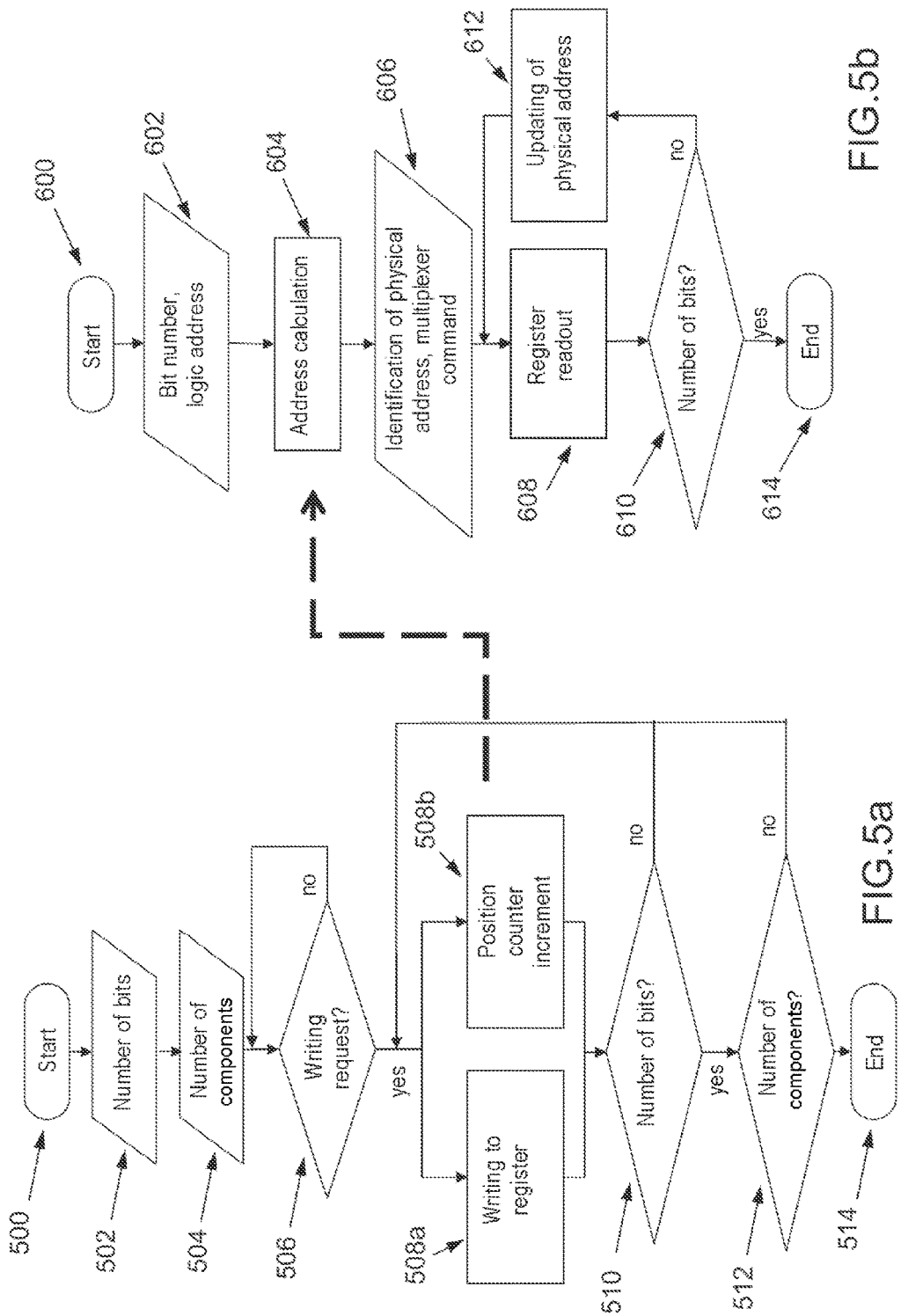

SYSTEM AND METHOD FOR COMMUNICATION BETWEEN A DATA-ACQUISITION CIRCUIT AND A DATA-PROCESSING CIRCUIT

CROSS-REFERENCE TO RELATED APPLICATIONS

This application is a National Stage of International patent application PCT/EP2012/075566, filed on Dec. 14, 2012, which claims priority to foreign French patent application No. FR 1161987, filed on Dec. 20, 2011, the disclosures of which are incorporated by reference in their entirety.

FIELD OF THE INVENTION

The invention relates to data-acquisition and data-processing systems and, more specifically, to communication systems between image-acquisition and image-processing circuits.

PRIOR ART

Numerous types of sensors enable the acquisition and generation of signals, which signals may constitute an image.

A vision system or intelligent imager is a module comprised of an image sensor, associated with computing components for the execution of enhancement or content analysis functions on the image captured. Known vision systems are de-signed on the basis of discrete components, whereby the sensors are connected to processing circuits by means of a hard-wired interface or route all data from the sensor in succession. These systems are relatively cumbersome and characterized by high energy consumption, thereby restricting the use thereof as low-cost stand-alone systems.

The progressive introduction of the use of integration technologies in the field of imagers permits the integration, in a single circuit, of the image sensor and the image processor.

However, the mode of coupling between the image capture zone and the image processing zone remains a critical point for the achievement of an effective compromise between dimensions and processing performance.

A standard solution involves the displacement of the scanning circuits of the data-acquisition matrix to the line-end or column-end of the matrix. Data values scanned are then transmitted in sequence via serial links to a bulk memory, also described as image memory, or to computing components. This mode of coupling between the capture zone and the processing zone severely restricts the possibility for the on-site execution of complex processing functions with low hardware costs.

An emerging technology based upon the stacking of silicon layers, described as "3D stacking", provides an opportunity for the execution of parallel communication functions between the data-acquisition matrix and computing components, whereby coupling is improved by means of surface interconnection rather than peripheral interconnection, as in the case of conventional circuits.

The article by P. Dudek et al., entitled "A pixel-parallel cellular processor array in a stacked three-layer 3D silicon-on-insulator technology", European Conference on Circuit Theory and Design, ECCTD 2009, pp 193-197, August 2009, describes an integrated vision system using 3D silicon stacking technology. An inter-mediate analog layer receives pixel data from the upper layer of the sensor and transmits these data to a lower digital layer, thereby creating a unitary processing cell (PE cell) in which the flux is distributed over three layers by means of "Through Silicon Vias" (TSVs). In a combined analog/digital system of this type, operating by means of pixel-by-pixel conversion, the pixel fill factor is restricted, thereby resulting in the direct impairment of processing performance.

There is therefore a need for a communication system between a data-acquisition circuit and an image-processing circuit which, whilst compatible with the increasingly stringent performance requirements and complexity of image processing functions, also optimizes the pixel fill factor.

The present invention fulfills this requirement.

SUMMARY OF THE INVENTION

One object of the present invention is the provision of a communication system between a data-acquisition circuit and a data-processing circuit.

A more specific object of the present invention is the provision of an integrated communication interface between an image sensor and an image-processing circuit.

More specifically, the interface circuit comprises a series of memorization circuits, arranged to permit the execution of a number of simultaneous operations for the serial writing of acquisition values, whilst independently permitting a number of simultaneous operations for the serial readout of such values, for the processing thereof.

Preferentially, the communication circuit in the present invention will optimize vision systems in which image sensors are photodiode matrices, together with vision systems incorporating sensors which operate on different wavelengths, distributed over regular bi-dimensional matrices.

A further object of the present invention is the provision of an integrated vision system which renders the image-acquisition function transparent for the user by the application of a "rolling-shutter" technique.

A further object of the invention is to propose a method for the addressing and specific control of registers, operating by means of shift registers at the time of acquisition of information in series.

Advantageously, but not by way of limitation, the invention may be applied in shape recognition systems (objects and/or persons) or object tracking systems in the fields of robotics, security, automobiles, home automation or medicine.

For the achievement of the desired results, a communication system of the type described in independent claim 1 and a communication method of the type described in independent claim 12 are proposed.

Different variants of implementation are described in the dependent claims.

DESCRIPTION OF THE FIGURES

Various aspects and advantages of the invention will emerge with sup-port from the description of one preferred form of embodiment of the invention, which is not provided by way of limitation, with reference to the following figures:

FIGS. 5-a and 5-b represent a sequence of stages for the writing and readout of data in series in a register column according to FIG. 2.

DETAILED DESCRIPTION OF THE INVENTION

Figure 1:
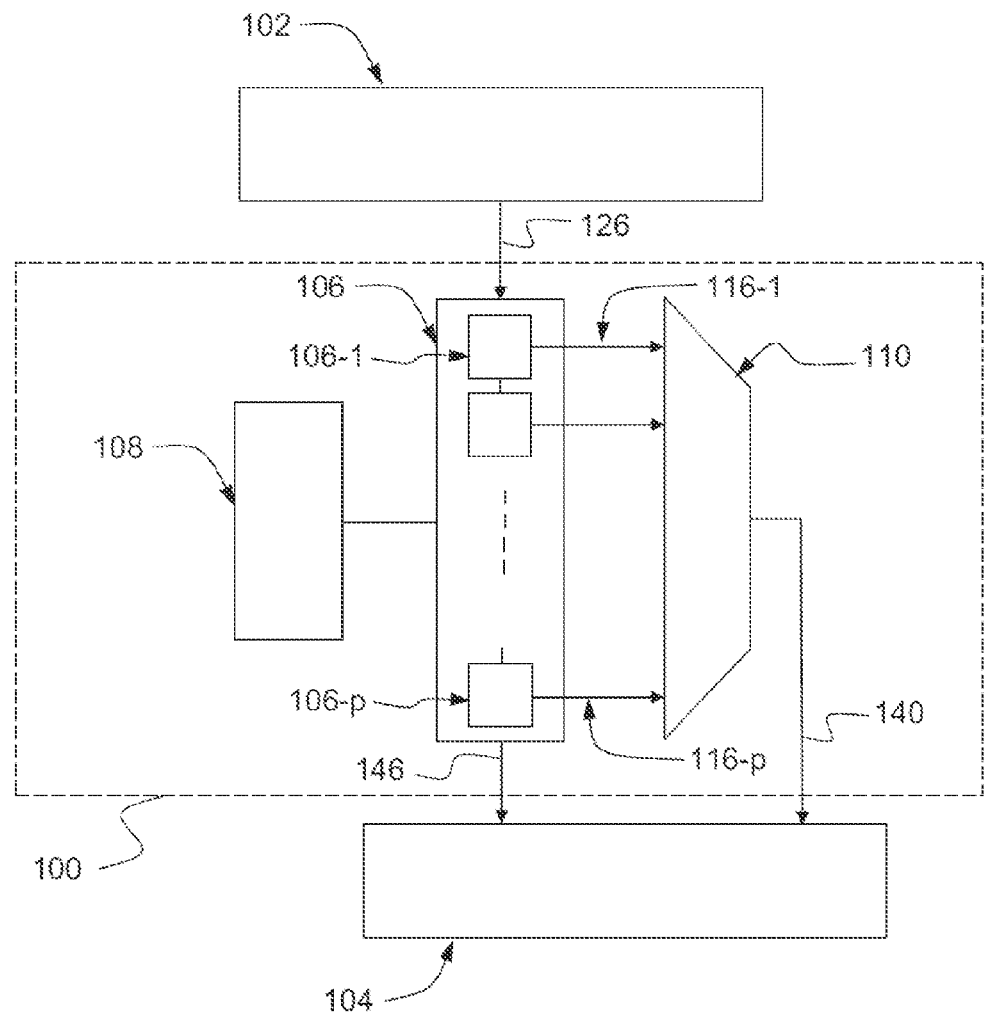
FIG. 1 shows a schematic representation of the communication system according to the present invention.

FIG. 1 shows a schematic representation of the communication system according to the present invention. The communication system (100) is a memorization structure which is optimized for the acquisition and processing of data. The description is based upon a preferential mode of operation of a communication system between an image-acquisition circuit (102) and a circuit (104) for the processing of image data or pixel values.

The system (100) comprises a shift storage unit (106) of the shift register type, coupled at its input to the acquisition circuit via a serial link (126) and at its output to the processing circuit (104) via a serial link (146).

In a preferred form of embodiment, the shift register (106) comprises a plurality of individual circuits of the flip-flop type (106-1, 106-p) connected in series. The shift register also comprises parallel outputs (116-1, 116-p) for the outputting of values contained in the respective flip-flops (106-1, 106-p).

The register comprises a "read-only" control port (not illustrated) to enable the parallel readout of data from the flip-flops, whilst blocking any writing operations in the register.

An address calculation module (108) is coupled to the unit (106) for the identification of the positions of data stored in the flip-flops, the addressing of the individual circuit specified and the control of the multiplexer 110.

A multiplexer unit (110) is coupled to the shift register (106) to receive data from the register via parallel links (116-1, 116-p). The multiplexer is coupled at its output to the data-processing circuit (104) for the serial outputting of data via a serial link (140).

Figure 2:
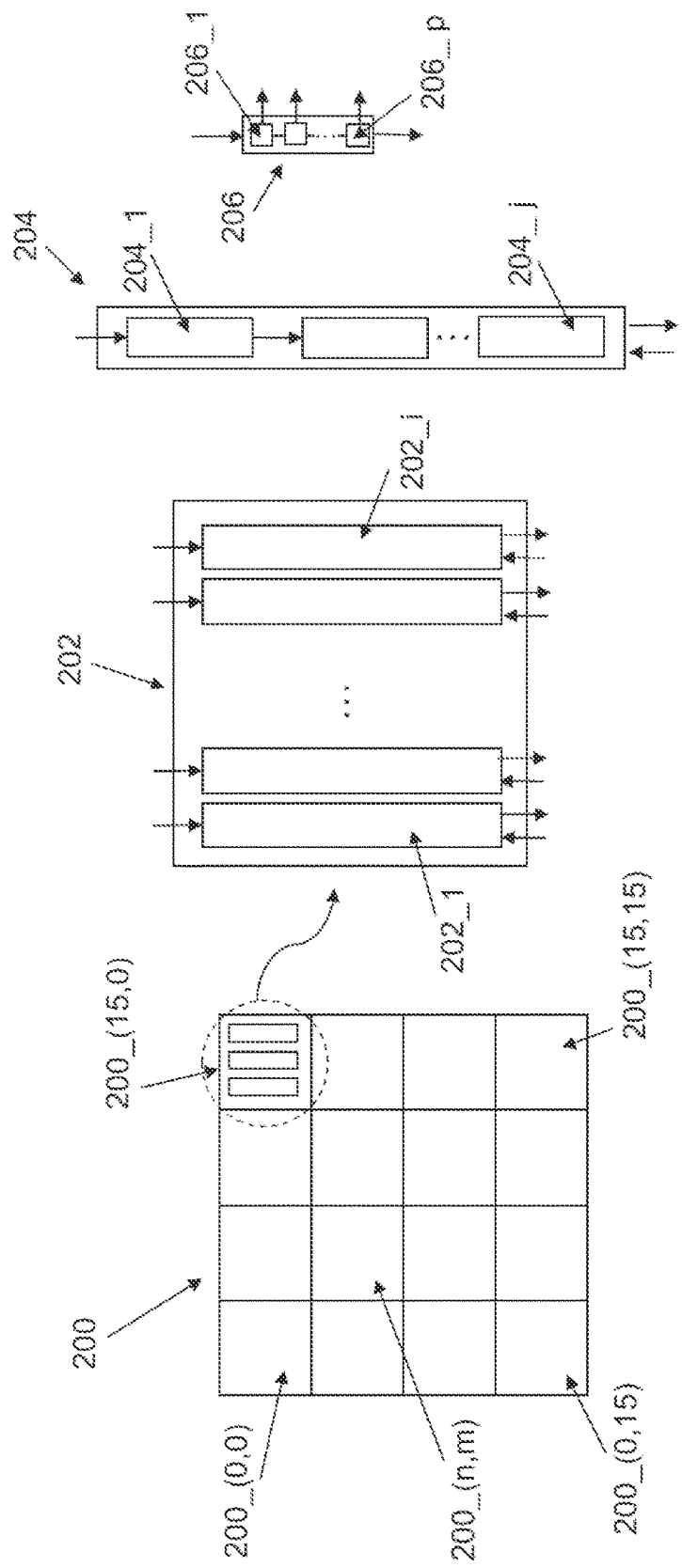
FIG. 2 shows a logic diagram of hierarchical levels in the communication system according to the present invention.

FIG. 2 illustrates, in the form of a logic diagram, the memorization matrix structure of the communication system according to the present invention, in a form of embodiment in which a number of shift registers are used. Structured by hierarchical levels of memorization, the proposed solution permits the simultaneous execution of a number of operations, including multiple writing operations and multiple readout operations simultaneously from one or more shift registers. Data originating from the acquisition circuit and data originating from the processing circuit may be written simultaneously in different shift registers, while other registers may be used for the readout of data, in order to execute processing operations.

As illustrated in FIG. 2, in a preferred form of embodiment of the image processing function, the system is structured in four hierarchical levels (200, 202, 204, 206). An upper level (200), described here as the memorization matrix, is structured as a matrix of cells (200_n,m), described here as macro-pixels. Each macro-pixel (202) is a memorization sub-matrix, which comprises a plurality of memorization columns (202-1, 202-i). Each memorization column (204) comprises a plurality of shift registers (204-1, 204-j), wherein each shift register 206 constitutes the last level of memorization and comprises individual storage components (206-1, 206-p), as described for FIG. 1.

The memorization sub-matrices (202) are uniform, and the maximum memorization capacity of each sub-matrix is at least equal to the data volume of a macro-pixel. An example of appropriate capacity for image-acquisition and image-processing is e.g. 16×16 pixels.

Each memorization sub-matrix is comprised of memorization columns (204), each column able to have a capacity of 16 pixels (or more) in the previous example. To this end, each memorization column is comprised of a number of shift registers coupled in series, such that the serial output of a preceding register becomes the serial input of the next register.

In one variant of embodiment, a selector circuit is connected to the input of each register in a single column, in order to make it possible to receive data in series from one or more shift registers in adjoining columns and/or to receive data in series from the processing circuit.

Each column in a sub-matrix is provided with input ports for external data: an input port which may be connected to the output of an analog/digital converter, receiving pixels in series by the "rolling-shutter" technique on one pixel column of a macro-pixel, and a data input port which may be connected to the output of the computing components in the processing circuit. Each column is also provided with an input/output port for communication with adjoining columns.

These data interfaces operate in serial mode. The constituent columns of a sub-matrix operate concurrently, and are mutually synchronous within a macro-pixel. Likewise, the sub-matrices function independently of each other. The mutual operation of the sub-matrices may be either synchronous or asynchronous.

Each register has a storage capacity which is at least equal to the largest permissible dynamic of pixels. The largest dynamic accommodated is that given by the analog/digital interface at the output of the acquisition circuit, which is that of an analog-digital converter. Accordingly, in the example cited, one memorization column is comprised of at least 16 shift registers (204-1 to 204-16), whereby each register forms a word with a 16 bit-width.

Each column is replicated 16 times to form a macro-pixel of 16×16 pixels, whereby the combination of macro-pixels is structured as a memorization matrix (200) with a capacity which is at least equivalent to that of the acquisition zone.

In a matrix application of this type, a single address calculation module is sufficient for all the columns in a given macro-pixel so as to address all the positions for stored values.

In an intelligent image sensor application, the acquisition zone may advantageously be a photodiode matrix, structured in the form of macro-pixels of 16×16 pixels, with 16 converter circuits receiving pixels in "rolling-shutter" mode and a dedicated SIMD processor for image processing. The processor is preferentially structured as a matrix of SIMD computing components, wherein each computing component is dedicated to a macro-pixel.

An expert will be able to appraise the maximum capacity of the memorization matrix as a function of the available surface per macro-pixel and the density of integration of the technology applied. Accordingly, the total memorization space may be divided into a number of memorization zones, whereby each zone is provided with its own dynamic. The characteristics of each memorization zone are mutually independent. Partitioning may be applied as a function of the choice of data dynamic and memorization zone requirements. As a minimum, each memorization sub-matrix will be comprised of only a single memory space with a maximum data dynamic. As a maximum, each memorization sub-matrix is divided into as many memory spaces as possible, the depth of which is defined by the minimum dynamic, e.g. 1 bit. If the choice of dynamic of pixels for the image in the course of acquisition is lower than the maximum possible dynamic, the space not used by the image in the course of acquisition can be used for the execution of writing and readout functions by computing components in the processing circuit.

Figure 3:
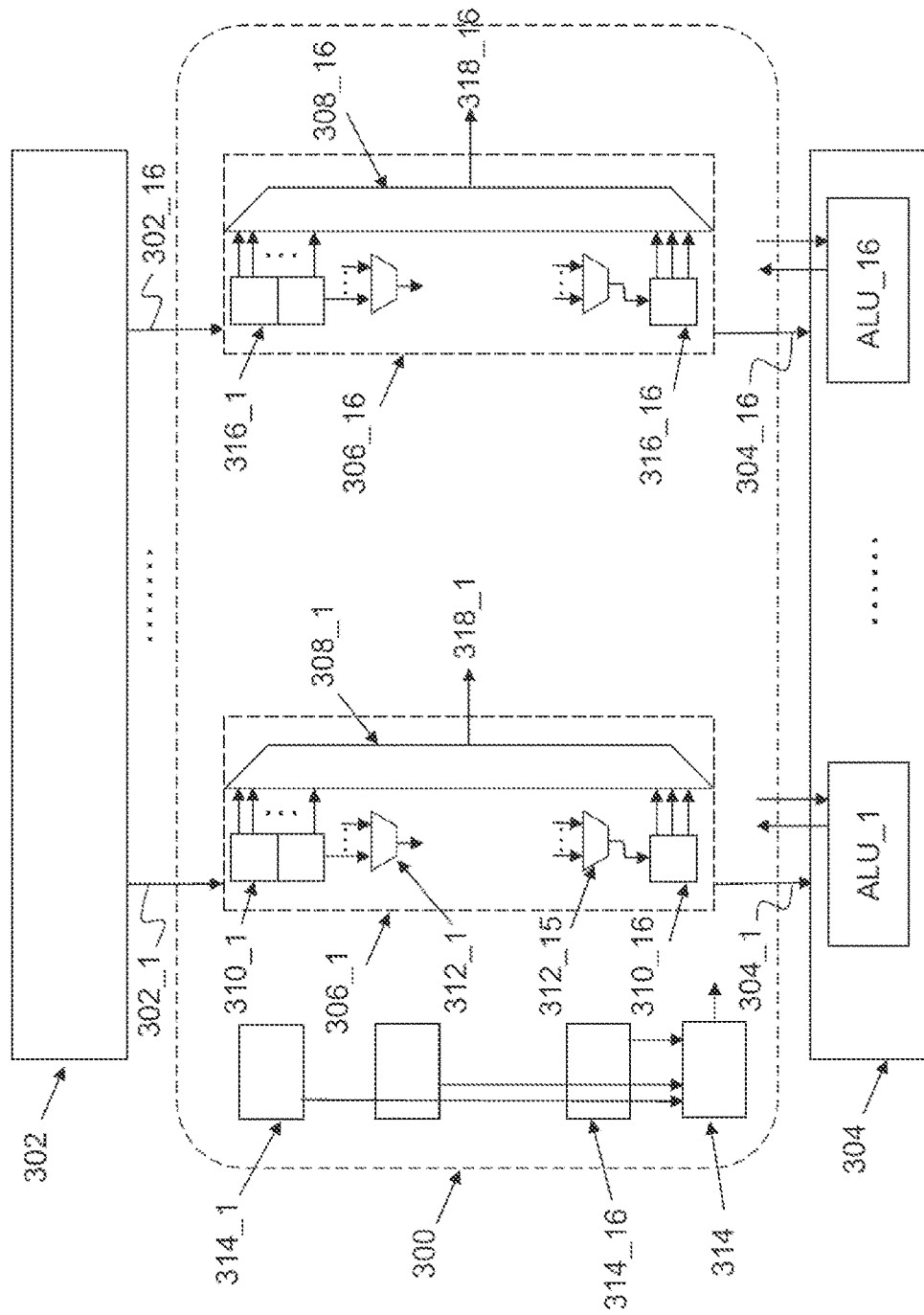
FIG. 3 illustrates an implementation of a macro-pixel cell according to FIG. 2.

FIG. 3 shows an example of embodiment of a macro-pixel cell (300) of 16×16 pixels. In the interests of clarity in the description, only the interconnecting links with east-west registers in adjoining columns are represented, but it should be noted that this description is not restrictive, and will also apply to the interconnecting links with north-south registers in adjoining columns. In practice, each shift register column is connected to its four adjoining columns (north, south, east and west). These connections are provided in the form of serial links. The shift registers are connected to form a long shift register chain, running in two directions (left to right or bottom to top). By means of successive shift composition, movements such as sliding windows or complex movements such as image rotation may be achieved accordingly.

An expert will easily be able to adapt the description to an extension of links in all directions.

A macro-pixel cell (300) is comprised of 16 register columns (306-1 to 306-16) and each column is comprised of at least 16 registers. Accordingly, the first column (306-1) contains at least 16 registers (310-1 to 310-16) and the sixteenth column (306-16) contains at least 16 registers (316-1 to 316-16).

The macro-pixel cell is connected to the acquisition circuit (302) via 16 serial links (302-1 to 302-16). The output interface of the acquisition circuit is not described in further detail here, as it may be configured as any known type of analog-digital converter which permits the adaptation of the format of pixel data acquired by the acquisition circuit into words of a predefined width. In the case described, a word is predefined with a dynamic of 16 bits. Each word is transmitted on one serial link, such that a first 16-bit word is transmitted to the first serial link (302-1), and one macro-pixel may transmit up to 16 words of 16 bits in parallel on each serial link. As a minimum, each column of 16 registers may store up to 16 words of 16 bits.

The macro-pixel cell is connected at its output to the processing circuit (304) via serial output links (304-1 to 304-16) of the registers, and by serial output links of the multiplexers 318. The input interface of the processing circuit is not described in greater detail here and, in a preferential form of embodiment, processing units of the Arithmetic Logic Unit type (ALU-1 to ALU-16) are dedicated to each macro-pixel column. Accordingly, the first serial link (304-1) in the first column (306-1) transmits data in series to the processing unit (ALU-1) for the execution of on-site functions.

Similarly, each serial link in the multiplexer (318-$i$) transmits data in series to the processing circuit via a respective serial link.

As described previously, each register is provided with a serial writing port, a serial readout port and 16 parallel readout ports.

The parallel readout ports of the 16 registers in a single column are the 16×16 inputs of a multiplexer (308-1 to 308-16) which is provided with a serial output (318-1 to 318-16) for the bit-by-bit transmission of data to the dedicated unit (ALU-1 to ALU-16) in the processing circuit.

The serial output of a register is the input of a multiplexer (312-1 to 312-16) which also receives the serial outputs from the four adjoining registers (not illustrated). Moreover, as described in detail in relation to FIG. 4, each multiplexer is able to receive, via a serial link, interim result data from the processing unit which is dedicated to the respective column.

The addressing of data stored in a macro-pixel is achieved by means of a position counter circuit, coupled to an address generator circuit. A position counter (314-1 to 314-16) is dedicated to each register column, and each position counter is coupled to a common address generator (314) for a macro-pixel. The position counter allows the tracking, in successive increments, of the position of data written in the registers, regardless of the origin of the data bit (analog/digital converter, processing unit or adjoining register). It also permits the readout of data, by positive or negative increments in succession, by means of the addressing of the first or last bit of the word read.

Position counters are connected to an address generator (314) which delivers the physical address of the data bit to be read in the respective column.

The addressing of these bits, combined with the position counter which is synchronized to the "rolling-shutter" acquisition mechanism, enables the pixels to be read out freely from the acquisition position of the "rolling-shutter" and, accordingly, from their position in the shift registers.

A configuration circuit (not illustrated) permits the definition of the number of bits to be read or written for each word, in accordance with a predefined dynamic. A chosen dynamic may permit the readout or writing of words of size lower than, or equal to, the maximum capacity accommodated by the acquisition circuit. For example, for a maximum acquisition capacity of 16 bits, a writing dynamic may be of 12-bits. The space not used for data in the course of acquisition is used for writing and readout operations, as described below with reference to FIG. 4.

Figure 4:
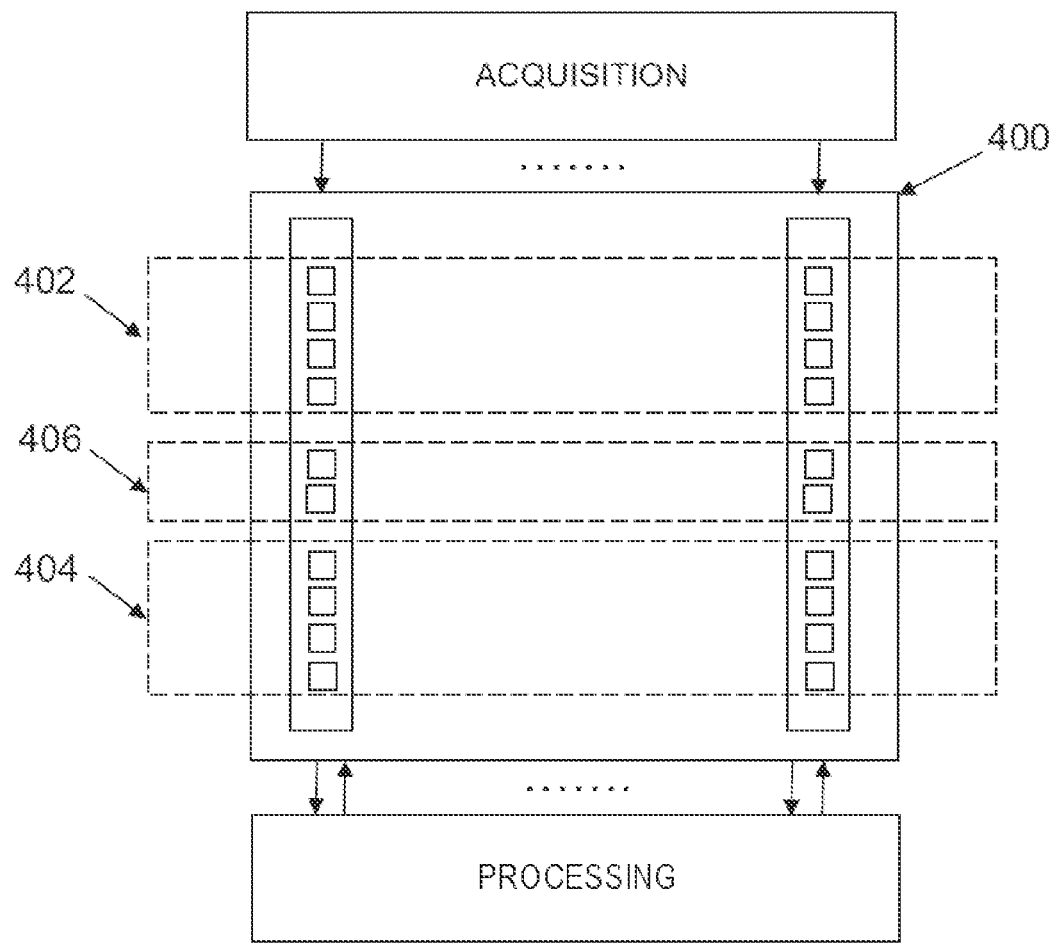
FIG. 4 shows a logic diagram for the structuring, in three memorization zones, of a macro-pixel cell according to FIG. 2.

FIG. 4 shows, in the form of a logic diagram, an example of the partitioning of a macro-pixel cell into a memorization sub-matrix (400) with three memorization zones (402, 404, 406).

Partitioning is applied as a function of the choice of data dynamic and the requirements of the memorization zone. As a minimum, each memorization sub-matrix will contain only a single memory space with a maximum data dynamic. As a maximum, each memorization sub-matrix will be divided into as many memory spaces as possible, the depth of which will be determined by the minimum dynamic, e.g. 1 bit.

In the example shown in FIG. 4, the memory space of the memorization sub-matrix is divided into three separate memory spaces, which are distributed over all the register columns of the macro-pixel. Each memory space is characterized by its data dynamic, and by its writing and readout ports. In the example selected, the first space (402) has a parameterizable data acquisition dynamic. The second memory space (404) is used for the memorization of interim calculation results generated by the computing components, and for the sliding of data to the left or the right, or upwards or downwards towards adjoining shift register columns.

The third memory space (406) is dedicated to the memorization of final results. A configuration of this type may be used, for example, for convolution calculations.

The writing of data in a memory zone of a memorization sub-matrix proceeds in series for each shift register column, and in parallel over all the columns of the macro-pixel. Regardless of the size of the memorization zone for acquisition, the writing of data in the shift register columns proceeds by means of a "push" function, whereby each data bit written displaces the previously memorized data bit, until such time as the depth of the zone reserved in the shift register is achieved.

Once the acquisition dynamic has been selected, data acquisition will invariably proceed on the same memorization zone by the updating of previous values, in accordance with the writing mode described above. Accordingly, the position of data in the shift register is dependent upon the position of the acquisition "rolling-shutter". The addressing devices 314 retain the trace for the position of data, thereby permitting the readout of data from a logic address which is independent of the position of the "rolling-shutter" by means of the multiplexer 308.

FIGS. 5-*a* and 5-*b* represent a sequence of stages for the writing and readout of data in series in a shift register column of a macro-pixel.

The process 500 represented in FIG. 5-*a* describes the stages involved in the writing of a data bit stored in a register column. At stage 502, the dynamic of words to be written is defined (number of bits).

At stage 504, the number of words to be written in a given column is defined.

The process awaits the detection of a writing request at stage 506 ("No" loop).

When a writing request is detected ("Yes" branch), the process advances to stages 508-*a* and 508-*b* where, respectively, the first bit is written in the register (508-*a*) and, simultaneously, the position counter advances incrementally (508-*b*).

Then, at stage 510, the process tests whether the maximum number of values to be written has been achieved and, if not, returns to stages 508-*a* and 508-*b* (via the "No" loop).

Once all the bits in a given word have been written ("Yes" branch), the process tests, at stage 512, whether all the words in a given column have been written and, if not, returns to stages 508-*a* and 508-*b* (via the "No" loop).

Once all the words in a given column have been written ("Yes" branch), the process ends at 514.

Asynchronously, when the position counter advances incrementally at stage 508-*b*, its value permits the calculation of the physical address of the data bit written, in order to authorize a readout.

The process 600 represented in FIG. 5-*b* describes the stages involved in the readout of a data bit stored in a register column. At stage 602, the dynamic of the word to be read (number of bits) is defined, and the logic address of the word is identified.

At stage 604, the process calculates the physical address of the value to be read, using information supplied by the position counter at stage 508-*b* of the writing process and the dynamic defined at stage 602.

At stage 606, the actual address of the value requested by the computing device is calculated from the logic address provided by the device which accesses the data bit concerned, and from the physical address calculated at stage 604. This permits the control of the multiplexers 308 which, accordingly, address the bits requested in the shift registers.

The process continues to stage 608, where the data bit stored at the physical address calculated is read.

At the following stage 610, the process tests whether all the values for the word have been read. If not, the process updates the physical address of the next value to be read, and returns in a loop to stage 608 for the readout of the corresponding data bit.

Once all the values have been read, the process ends (614).

As described, the process advantageously improves data-acquisition and data-processing times. In practice, the matrix structure proposed thereby permits the conservation of the information flux in serial form in the memorization unit, simplifying writing and communication functions with adjoining components, which also process information in series. The process permits the simultaneous execution of a number of writing and readout access functions, together with access to any part of the memorized information flux, without the need to know the exact position of data in the shift registers, due to the "rolling-shutter" function. For example, but not by way of limitation, a sequence of simultaneous operations may be the writing of data from the acquisition circuit, the writing of data originating from an adjoining register to the right, the writing of data originating from an adjoining register to the left, and the writing of data resulting from a processing function, in combination with various data readout operations to adjoining registers or to the processing circuit.

Moreover, the configurable encoding of words permits the simultaneous accommodation of words of different sizes, thereby optimizing the size of the matrix. This property is extremely useful in the case of a highly-integrated intelligent sensor, in which the surface area of silicon available for memorization is limited, but in which algorithms require substantial capabilities for the memorization of diverse variables.

A number of major advantages of the proposed solution may be usefully reviewed:
  direct compatibility with serial acquisition and processing circuits, without the need for an additional reformatting device, and more specifically with image capture devices operating in "rolling-shutter" mode;
  capability for the simultaneous accommodation of the encoding of data of different sizes, with no loss of memorization capacity;
  simultaneous access to multiple writing and readout functions, on different memorization zones;
  access to regions of interest of variable size.

The present invention may be implemented on the basis of hardware and software components. The memorization units may be comprised of shift registers, as described above. Alternatively, implementation on the basis of standard "Random Access Memory" (RAM) functions or a RAM unit is applied for a column in a memorization sub-matrix in order to achieve the same result.

The present description of the invention is therefore intended to illustrate a preferential form of embodiment, but is not restrictive. Although one example has been chosen in the interests of the effective understanding of the principles of the invention, and for the illustration of a practical application, this description is in no sense exhaustive, and will permit the expert to execute modifications and variants of implementation whilst maintaining the same principles.

The invention claimed is:

1. A communication system for operating between a data-acquisition circuit and a data-processing circuit, the data acquisition circuit configured to generate data-words having a predefined number of data-bits to be written and to be read, the communication system comprising:
  at least one shift register having a serial input for receiving data-words and storing in series the predefined number of data-bits to be written, and a serial output for outputting data-bits in series, whereby said at least one shift register further includes a plurality of parallel outputs for, simultaneously to the serial storing and serial outputting, outputting of data-bits stored in said at least one shift register;

an addressing circuit coupled to said at least one shift register for identifying the positions of each data-bit of each data-word stored in said at least one shift register and for calculating the address of a data-word to be selected; and a multiplexer coupled to the plurality of parallel outputs of said at least one shift register for reading out under a control of the addressing circuit, a predefined number of data-bits of the selected data-word, and for serially transmitting the data-word to the data-processing circuit.

2. The communication system as claimed in claim 1, wherein said at least one shift register comprises a plurality of storage components connected in series for storing data-bits in series, and a plurality of addressing circuits and multiplexors for outputting several data-words from the parallel outputs.

3. The communication system as claimed in claim 1, further comprising means for coupling operatively a plurality of shift registers in at least one register column, whereby each column comprises:

a plurality (j) of shift registers, wherein the serial output of one register (j−1) constitutes the serial input of the following register (j);

identification means coupled to said at least one column of registers (j) for identifying the positions of data-bits written in the plurality of shift registers; and a multiplexer coupled to said at least one register column for outputting to the processing circuit data originating from the parallel outputs of the shift registers (j).

4. The communication system as claimed in claim 3, further comprising means for the operatively combining a plurality of shift register columns in a storage matrix of capacity equal to that of the acquisition circuit.

5. The communication system as claimed in claim 1, further comprising:

a selector circuit coupled to said at least one shift register for selecting data-bits in series received as input from said at least one shift register, either from the acquisition circuit, from one or more adjoining shift registers, or from the processing circuit.

6. The communication system as claimed in claim 5, further comprising:

a configuration circuit coupled to the selector circuit for configuring the number of data-bits in series received from the acquisition circuit, from one or more adjoining shift registers, or from the processing circuit.

7. The communication system as claimed in claim 6, wherein the adjoining shift registers are in one or more register columns.

8. The communication system as claimed in claim 1, wherein the data-processing circuit comprises a plurality of processing units, whereby each processing unit is coupled to said at least one shift register for receiving data-bits from the serial output of said at least one shift register and/or data-bits from parallel outputs.

9. The communication system as claimed in claim 1, wherein the data-acquisition circuit comprises a pixel matrix structured in lines and columns, and a control circuit for reading the pixel matrix in rolling-shutter mode, and for serially outputting pixel values to the communication system.

10. The communication system as claimed in claim 1, wherein the acquisition circuit is a stacked type integrated vision system, and in which the data-processing circuit is a "Single Instruction Multiple Data" type processor.

11. The communication system as claimed in claim 1, wherein said at least one shift register column is a Random Access Memory.

12. A communication method for operating between a data-acquisition circuit and a data-processing circuit, the data acquisition circuit configured to generate data-words having a predefined number of data-bits to be written and to be read, the method comprising the steps of:

a) defining a number of writing operations and initializing a position counter;

b) detecting a data writing request;

c) writing and storing a first data-bit in a first storage component of a shift register, wherein said shift register comprises a serial input for receiving data-bits in series from the data-acquisition circuit and a serial output for outputting data-bits in series, and further comprising parallel outputs associated with each storage component in said register, for, simultaneously to the serial storing and serial outputting, outputting data-bits stored in said storage components;

d) identifying the position of each data-bit of each data-word stored in the shift register;

e) incrementing the position counter, f) repeating steps b) to e) for the number of writing operations defined;

g) detecting a data-word readout request;

h) calculating the address of the data-word stored in the shift register from the positions of the data-bits identified at step (d);

i) reading out, from the parallel outputs, data-bits stored in the shift register at the address calculated; and j) multiplexing the data-bits read out for transmitting data-bits in series to the data-processing circuit.

13. The method as claimed in claim 12, wherein the writing step (c) and the readout step (i) are asynchronous.

14. The method as claimed in claim 12, wherein the writing step (c) comprises writing of data-bits from the data-processing circuit.

* * * * *